(12) United States Patent
Kam et al.

(10) Patent No.: US 7,764,433 B2
(45) Date of Patent: Jul. 27, 2010

(54) METHOD AND SYSTEM FOR CORRECTING OPTICAL ABERRATIONS, INCLUDING WIDEFIELD IMAGING APPLICATIONS

(75) Inventors: Zvi Kam, Tel Aviv (IL); David A. Agard, Burlingame, CA (US); Peter Kner, San Mateo, CA (US); John W. Sedat, San Francisco, CA (US)

(73) Assignees: The Regents of the University of California, Oakland, CA (US); Yeda Research and Development Co., Ltd., Rehovot (IL)

( * ) Notice: Subject to any disclaimer, the term of this patent is extended or adjusted under 35 U.S.C. 154(b) by 616 days.

(21) Appl. No.: 11/419,070

(22) Filed: May 18, 2006

(65) Prior Publication Data

US 2007/0268592 A1   Nov. 22, 2007

(51) Int. Cl.
  *G02B 27/14* (2006.01)
(52) U.S. Cl. ........................ 359/637; 359/368
(58) Field of Classification Search ............... 359/637
  See application file for complete search history.

(56) References Cited

U.S. PATENT DOCUMENTS

| | | | |
|---|---|---|---|
| 5,880,896 A | 3/1999 | Ishii et al. | |
| 6,005,709 A | 12/1999 | Silver | |
| 6,166,853 A | 12/2000 | Sapia et al. | |
| 6,172,957 B1 | 1/2001 | Ogasawara | |
| 6,320,699 B1 | 11/2001 | Maeda et al. | |
| 6,483,641 B1 * | 11/2002 | MacAulay | 359/385 |
| 6,587,425 B2 | 7/2003 | Ohno et al. | |
| 6,658,142 B1 | 12/2003 | Kam et al. | |
| 6,771,417 B1 | 8/2004 | Wolleschensky et al. | |
| 6,924,944 B2 | 8/2005 | Sekiyama et al. | |
| 6,974,939 B1 | 12/2005 | Yamada | |
| 7,012,875 B2 | 3/2006 | Shimano et al. | |
| 2005/0207003 A1 * | 9/2005 | Kobayashi | 359/368 |
| 2005/0265143 A1 | 12/2005 | Kubota et al. | |

OTHER PUBLICATIONS

Albert et al. "Smart microscope: an adaptive optics learning system for aberration correction in multiphoton confocal microscopy", Optics Letters, 25(1): 52-54 (Jan. 1, 2000).

(Continued)

*Primary Examiner*—Jordan M. Schwartz
*Assistant Examiner*—James C Jones
(74) *Attorney, Agent, or Firm*—Stroock & Stroock & Lavan LLP (57) ABSTRACT

A system and method for correcting optical aberrations in optical devices, such as wide-field microscopes, optical tweezers and optical media devices, such as DVD drives. The system uses adaptive optics to correct optical aberrations, such as spherical and space-variant aberrations. Spherical aberrations can be corrected using one adaptive optical elements and space-variant aberrations can be corrected using numerous adaptive optical elements in tandem. The adaptive optical elements may be of several types, such as a liquid lenses, deformable membrane mirrors or various liquid crystal phase and amplitude modulators. Adaptive optics can also be used to simultaneously shift the focus of the optical device and correct optical aberrations.

58 Claims, 4 Drawing Sheets

OTHER PUBLICATIONS

Booth et al. "Aberration correction for confocal imaging in refractive-index-mismatched media", Journal of Microscopy, 192(2): 90-98 (Nov. 1998).

Booth et al. "Adaptive aberration correction in a confocal microscope", PNAS 99(9): 5788-92 (Apr. 30, 2002).

Hoshida et al., "Effects of Preconditioning with Ebselen on Glutathione Metabolism and Stress Protein Expression", The Journal of Pharmacology and Experimental Therapeutics, vol. 281, No. 3, pp. 1471-1475 (Feb. 28, 1997).

Kam et al. "Computational adaptive optics for live three-dimensional biological imaging", PNAS 98(7): 3790-95 (Mar. 27, 2001).

Kam et al. "Three-dimensional microscopy in thick biological samples: a fresh approach for adjusting focus and correcting spherical aberrations", Bioimaging 5: 40-49 (1997).

Ragazzoni et al. "Adaptive-optics corrections available for the whole sky", Nature 403(6): 54-56 (Jan. 6, 2000).

Schwertner et al. "Characterizing specimen induced aberrations for high NA adaptive optical microscopy", Optics Express 12(26): 6540-52 (Dec. 27, 2004).

Swedlow et al. "Deconvolution in optical microscopy", chapter in Deconvolution of Images and Spectra $2^{nd}$ ed., Academic Press (1997).

Swedlow et al. "Live cell imaging using wide-field microscopy and deconvolution", Cell Structure and Function, 27(5): 335-41 (2002).

Swedlow. "Quantitative fluorescence microscopy and image deconvolution", Methods in Cell Biology, 72: 349-67 (2003).

Tokovinin et al. "Isoplanatism in a multiconjugate adaptive optics system", Journal of the Optical Society of America, 17(10): 1819-27 (Oct. 2000).

Booth, et al. "Predictive aberration correction for multilayer optical data storage", Applied Physics Letters 88, 031109 1-3 (2006).

* cited by examiner

METHOD AND SYSTEM FOR CORRECTING OPTICAL ABERRATIONS, INCLUDING WIDEFIELD IMAGING APPLICATIONS

This invention was made with government support under NIH Grant Nos. GM025101 and GM031627. Accordingly, the United states government may have certain rights in the invention.

FIELD OF THE INVENTION

The invention generally relates to a method and system for correcting optical aberrations using adaptive optics. More specifically, the invention relates to a method and system for correcting optical aberrations in wide-field microscopy, optical tweezers and in optical media devices.

BACKGROUND OF THE INVENTION

Many applications employing optical devices are limited by optical aberrations that result from the configuration of the optical device. The term "optical aberrations" includes the deviations from the correct function of the optical device that result from disruptions and distortions of the optical path associated with the device. Three optical devices of interest in connection with the present invention are wide-field microscopes, optical tweezers and optical media devices, such as DVD writers and players.

Wide-field microscopes are those which acquire an image of an entire field of view simultaneously, and image both the in-focus and the out-of-focus parts of a sample at once. This is in contrast to confocal microscopes, which are designed to image only one point of a sample at a time. Wide-field microscopy is particularly important in the biological field, where fluorescence is commonly used to image biological samples. In contrast to other types of microscopy, such as confocal microscopy, wide-field microscopy is the optimal methodology for harvesting the most photons in a given optical configuration. When image acquisition is followed by reconstruction methods, such as deconvolution, the out-of-focus contributions are shifted back to the focus, providing enhanced contrast and resolution of three-dimensionally acquired images.

One source of optical aberrations that is particularly limiting in the use of optical devices is the object of the optical device. The object, or sample, refers to the element that the optical device is designed to perform a particular function on. In wide-field microscopes the object is the sample being imaged. In optical media devices the object is the disk which is being written to or read from. Using wide-field microscopy as an example, the acquisition of a high-resolution, three-dimensional image of a cell is severely limited by optical aberrations resulting from the cell itself. Object-induced, or sample-induced, aberrations result from the refractive properties of the object and can be characterized into two groups: spherical aberrations and space-variant aberrations.

Spherical aberrations are mainly contributed by the depth that is being imaged within the sample with refractive index different than the immersion medium. When rays of light travel through a sample of uniform refractive index, they will travel at a certain speed and angle. When those rays of light exit the sample, the rays of light will bend to a different angle and travel at a different speed, according to the refractive index of the environment around the sample, thereby accumulating a different optical path (which is the product of physical path and the refractive index, which determines the phase of the wavefront). The bending of the ray and the changes in optical path causes the light to appear as if it originated from a different point in the sample, and distorts the constructive interference of these rays in the otherwise diffraction-limited image. The change in speed causes the wave-front to become aberrated, since two rays originating from the same point but traveling at different angles through the sample will travel a different distance within the sample and, therefore, experience a phase shift relative to each other. This phase shift could lead to constructive or destructive interference. This causes aberrations to be introduced at the image plane. Typically, an optical device will be designed so that a corrected image can be provided for one particular sample configuration, typically the most common configuration. Since the image is formed by interference of rays emanating from a point at all angles, and brought by well corrected optics to a diffraction limited pattern (that is, all rays reach the geometrical focus with the same phase), the image formed from a point inside a sample with refractive index different than the one for which the optics is corrected (i.e., a different sample configuration than the optical device was designed for) will not result from constructive interference of all rays coming from the source, and will instead become aberrated, Since depth effects are spherical, i.e., they are axially symmetric, two rays of light originating from the same point in the sample, which are traveling through the sample at the same angle but at a different orientation relative to the optical axis, will experience an identical aberration. Furthermore, two rays of light originating from different points in the same depth of the sample, will experience the identical aberration. Accordingly, the depth-induced spherical aberration is space-invariant for all points imaged at a given focal depth. Spherical aberrations cause a fast broadening of the in-focus point image, a fall in the peak image intensity and asymmetric distortions of the out-of-focus areas. Since the spherical aberration is caused by the rays of light traveling through the sample, it becomes more pronounced the longer the rays travel in the sample. Accordingly, the deeper into the sample the microscope is focused, the more aberrated the acquired image becomes due to spherical aberrations.

Space-variant aberrations occur when imaging a sample that does not have a uniform refractive index. Some segments of the sample have different refractive indexes than the rest of the sample, as in the case with most biological samples (inhomogeneous refractive index). For example, a cell has many different organelles, and each may have a different refractive index than the others. When a ray of light travels through the sample, it may travel through a segment which has a different refractive index than the segment it was previously traveling in. Accordingly, the ray of light will bend as it crosses between the two segment, and it will travel at a different speed in each segment. Each ray of light may travel through numerous different segments of different refractive indexes before it exits the sample. Furthermore, since the sample may not be symmetric, the aberrations will be asymmetric, i.e., two rays of light, originating from the same point in the sample, and which are traveling through the sample at the same angle but at different orientations to the optical axis will experience different refraction and phase shifts. Accordingly, space-variant, inhomogeneous, sample-induced aberrations depend on many different factors, including the depth and position in the sample from where the light is originating.

Different solutions have been suggested for correcting optical aberrations. U.S. Pat. No. 6,658,142, incorporated herein by reference, teaches a rigorous deconvolution scheme to computationally correct for sample-induced aberrations in imaging. According to the '142 patent, a) information about the refractive properties of the sample is acquired, b) a location dependent point spread function, which is an aberrated image of a point source, is derived from computationally tracing multiple rays from the point source through the sample according to the refractive information of the sample, and c) a corrected, aberration-free image is provided as the output from a computationally rigorous algorithm. Although effective, this approach significantly slows down the image acquisition process and poses a serious computational burden for image reconstruction.

Methods for correcting sample-induced aberrations in astronomy and confocal microscopy have been proposed using adaptive optics. The term "adaptive optics" refers to optical elements, such as lenses or mirrors, which can be adjusted and reconfigured to various different shapes or configurations. One such solution was proposed in Booth, M. J., Neil, M. A. A., Juskaitis, R. and Wilson, T. "Adaptive aberration correction in a confocal microscope" *PNAS.* 99(9): 5788-5792 (Apr. 30, 2002), incorporated herein by reference. Booth proposes using adaptive optics systems to correct for aberrations in confocal microscopy. This method uses a wave-front sensor to measure the aberrations in the wave-front, and adjusts an adaptive element in the optical path to correct these aberrations. This method is practical for confocal microscopy, in which each acquired image is created point by point, and it is possible, after only a few iterations, to adjust the adaptive element so that the intensity of the image is maximized and the aberrations are minimized. This method, however, requires multiple scans of the sample (with speed and sample damage consequences), and is not applicable for wide-field microscopy, in which the entire sample is depicted in the image, with each point differently aberrated. Since the image includes both in-focus and out-of-focus areas, adjustment to the adaptive element to maximize intensity cannot guarantee reduction of the aberrations, since the sensors cannot distinguish between the in-focus intensity and the out-of-focus intensity.

Similar to wide-field microscopes, optical tweezers are limited by optical aberrations. Optical tweezers, also known as laser tweezers, use the forces of laser radiation pressure to move and trap small particles at the focus of the laser beam. Optical tweezers are commonly used to measure forces on the order of 1-100 piconewtons. They function by producing light intensity gradients which drag particles into the focus of the laser beam, where the radiation forces at all directions are balanced, and the particle becomes trapped. Optical tweezers lose their holding power when the light gradients become weaker and the laser focus becomes blurred. This occurs when optical aberrations are introduced into the system. The deeper into the system the laser focuses, the spherical aberrations become more pronounced and the optical tweezers become less precise. For example, if one attempted to move and trap a polysterene bead deep within a biological system, it may not be possible to trap the bead due to aberrations. To overcome the effect of the aberrations it is possible to increase the laser power, however, at high laser powers it is probable that some damage will occur within the biological system.

Similar to wide-field microscope and optical tweezers, reading and writing information on a media disk, such as a DVD, using optical media devices is limited by optical aberrations. There are currently DVD drives which can write and read data from two layers of information on the DVD. The highest layer is closer to the surface of the DVD, and the second layer is beneath it, further into the DVD. It would be advantageous to be able to read and write data onto as many layers of the DVD as possible, so that more information can be stored on each DVD. In order to read or write data on a DVD, the light beam used to focus on the data needs to stay small enough so that it only focuses on one data bit at a time. However, as a DVD drive attempts to write or read data deep into the DVD, spherical aberrations are introduced. In order to properly write or read a DVD, the light beam used to read or write the data on the DVD needs to focus to a spot small enough to write or read each individual data bit. Furthermore, when using a multilayer DVD, the light beam needs to remain the same size when focused on each layer of data. If the light beam becomes too wide, it may focus on more than 1 data bit at a time, and therefore the data may be miswritten or misread. Current DVD players can not focus on more than two layers of data in a DVD. As the DVD player attempts to focus on more layers, the light beam becomes aberrated, and it widens to a spot that is larger than 1 data bit. Accordingly, any attempt to write or read data in these layers would cause the data to be miswritten or misread. Since these aberrations result from focusing beneath the surface of the DVD, the deeper into the DVD the DVD drive attempts to write or read, the more pronounced the spherical aberrations become.

Some solutions have been proposed to allow for multilayer reading and writing in optical media devices. U.S. Pat. No. 6,974,939, incorporated herein by reference, proposes using two or more different lenses in an optical media device to reduce spherical aberrations. These lenses are designed so as to provide the minimum spherical aberrations possible for reading or writing on the lowest layer on the media disk. Accordingly, the light beam produces a small spot when focused at that layer. When reading or writing on other layers in the media disk, the distance between the two or more lenses is changed to try to reduce the diameter of the light beam when focused at the other layer. However, the adjustment of multi-lens optics is slow and cannot reach optimal aberration correction with a small number of adjustable solid lenses. Therefore, this does not provide a practical solution for writing or reading a DVD with many different data layers.

There still is a need for a method and system for correcting optical aberrations in optical devices. In particular, there is a need for a method and system for correcting optical aberrations in wide-field microscopy, optical tweezers and in optical media devices which overcomes the disadvantages of the prior art approaches.

SUMMARY OF THE INVENTION

The present invention provides for a method and system to correct optical aberrations in optical devices, without the disadvantages associated with the prior art approaches. In particular, the present invention provides for a method and system to correct optical aberrations in wide-field microscopy, optical tweezers and in optical media devices using adaptive optics.

One aspect of the invention is to correct sample-induced spherical aberrations using adaptive optics. Spherical aberrations can be characterized by the shift in optical path experienced by a ray of light as it travels from the point source through the sample. For a given system, i.e., for a system with a set sample refractive index and a set atmospheric or objective immersion refractive index, the shift in optical path is only dependent upon the depth of the point source within the sample and the angle at which the ray of light travels through the sample relative to an axis perpendicular to the surface of the sample. The shift in optical path can be calculated as:

$$\delta OP = D(n_2 \cos \theta_2 - n_1 \cos \theta_1) \quad \text{Equation (1)}$$

where $\delta OP$=the shift in optical path,

D=the depth within the sample of the point source, $n_1$=the refractive index of the atmosphere or objective immersion medium, external to the sample, $\theta_1$=the angle relative to the surface of the sample at which the ray of light emerges from the sample and travels through the atmosphere after it exits the sample, $n_2$=the refractive index of the sample, and $\theta_2$=the angle relative to the surface of the sample at which the ray of light travels through the sample.

The derivation of this equation is shown on page 91 of Booth, M. J., Neil, M. A. A., and Wilson, T. "Aberration Correction for Confocal Imaging in Refractive-Index-Mismatched Media" J. of Microscopy. 192(2): 90-98 (November 1998), which is hereby incorporated herein by reference.

The back aperture conjugated plane, or the pupil plane, in an optical device is where the position of each ray depends solely on the angle of emergence from the sample alone, and is independent of the position or its origin. For any given optical device, it is possible to determine where at the pupil plane a ray with a particular angle of emergence will be positioned. Accordingly, at this plane, it is possible to identify the angle of emergence from the sample of each ray based upon the position of the ray at the plane. Since the shift in optical path depends on depth and angle alone at the pupil plane, for each depth it is possible to correct the spherical aberrations at the pupil plane by introducing an optical element that can correct each ray of light according to its optical path shift.

According to the present invention, it is possible to correct the spherical aberration of each ray of light for a multiplicity of positions at a given depth of focus within the sample by using a single setting of the adaptive optics. One or more adaptive optical elements are positioned in the pupil plane. Preferably one adaptive optical element is used. The adaptive optical element is then configured to correct for the spherical aberrations of one particular depth of focus within the sample. The adaptive optical element is then reconfigured to correct for the spherical aberrations of a different depth of focus within the sample. At each depth of focus, the adaptive optical element is configured to correct the spherical aberrations of each ray of light according to the shift in its optical path. This is accomplished by configuring the adaptive optical element to compensate for the shift in optical path, as calculated by Equation (1).

Adaptive optical elements are readily available. The adaptive optical element may be of several types, such as a liquid lens (adjusted by pressure), a deformable membrane mirror (adjusted by piezoelectric or magnetic pistons), micro electro-mechanical (MEMS) mirrors, or various liquid crystal phase and amplitude modulators (with optical properties that are controlled pixel-by-pixel electrically via the patterned surfaces holding the liquid between them). If the adaptive optical element is transmissive (lens or some liquid crystal devices), it may be inserted directly into the optical path. If the adaptive optical element is reflective (adaptive mirrors or reflective light modulators, where one surface holding the liquid is transparent glass, and the other is usually reflective silicon device), relay optics can be used to create a real conjugated pupil plane at which the adaptive optical mirror should be positioned. For the conjugated pupil plane this ensures that rays from the entire field of view reach the adaptive optical element at a plane where their positions are dependent only upon the angle of emergence from the source object to be imaged. Preferably, the adaptive optical element is a mirror, such as a deformable mirror. Even more preferably, relay optics are used to create a real conjugated pupil plane at which the deformable mirror is positioned.

According to the present invention, the optical device may focus on one or more depths within the sample. If the optical device is a wide-field microscope, it may acquire one image with one depth of focus, or it may acquire multiple images of different depths of focus. If multiple images are acquired, they may be used to construct a three-dimensional image of the sample. The images can be imported into a processing unit, such as a computer, which, through a deconvolution process, can output a three-dimensional image of the sample. The deconvolution process takes each image, which in wide-field microscopy includes both the in-focus and out-of-focus parts of the image, and shuffles back the out-of-focus parts of the image to their point of origin in the sample in order to construct the original three-dimensional source distribution in the sample. Deconvolution processes are well known in the art. Examples of deconvolution processes are listed in U.S. Pat. No. 6,658,142, which is hereby incorporated herein by reference.

Typically, a shift of focus from one depth within the sample to a different depth is accomplished by moving the objective lens of the microscope with respect to the sample. The objective lens is the lens that is situated directly above the sample. However, with many microscopic applications, such as biological imaging, oil-immersion systems are used. An oil-immersion system utilizes oil placed between the objective lens and the sample, in order to increase the angle of light collection, and therefore improve brightness and resolution. This oil couples the objective lens to the cover-slide covering the sample. Typically, both the cover-slide and the objective lens are made from glass. The oil is selected to have a refractive index similar to glass so that the rays of light will not bend as they exit the cover-slide, nor will they bend when they enter the objective lens. This allows for better resolutions at higher magnifications that are not possible with dry microscope objectives. Accordingly, the use of oil-immersion objectives have become common in many microscopy applications.

The use of oil-immersion objectives causes a problem when imaging multiple layers of a sample. Because the objective lens and the cover-slide are coupled by the oil, when the objective lens is moved closer to the cover-slide, forces may be transmitted through the immersion oil to the cover-slide, which may distort the cover-slide and squeeze the sample under the cover-slide. This problem is more pronounced when trying to acquire four-dimensional images of a sample, i.e., three-dimensional images taken in rapid succession over time. Such four-dimensional images are crucial for many different applications, such as analyzing certain dynamic biological processes that occur rapidly within a cell. When trying to acquire three-dimensional images in rapid succession, two-dimensional images of many different depths of the sample are acquired repeatedly over a short period of time. The fast movement of the objective lens may cause forces to be transmitted through the oil which are large enough to move and distort the sample.

Another aspect of the present invention is to provide for the acquisition of four-dimensional images with an oil-immersed microscope without the problems associated with movement of the objective lens. Using adaptive optics, it is possible to add a spherical curvature that shifts the depth of the focus without moving the objective lens. This shift of focus of an objective away from the plane for which the objective optics were fully corrected, to another plane, causes dramatic increase of aberrations. Using adaptive optics, it is possible to simultaneously adjust curvature and implement any other phase function that will correct optical aberrations while shifting the depth of the focus without moving the objective lens.

According to the invention, one or more adaptive optical elements are used to shift the depth of focus into a sample while correcting optical aberrations. Preferably, one adaptive optical element is used. Preferably, that adaptive optical element is a deformable mirror. The adaptive optical element is configured to simultaneously shift the focus depth of the image and to correct for aberrations associated with that depth. This is accomplished by adding a global curvature term to Equation (1) and using the modified equation to configure the adaptive optical element. The modified equation is as follows:

$$\delta OP = D(n_2 \cos\theta_2 - n_1 \cos\theta_1) + f(D,\theta) \quad \text{Equation (2)}$$

where $f(D,\theta)$ = is a global curvature term and a function of $\theta$ and D, where $\theta$ is proportional to the radius measured from the axial center of the adaptive element. At first order, $f(D,\theta) \propto D\theta^2$, where D is proportional to the radius of curvature of the mirror, R. The proportionality factor depends on the magnification behind the objective, used to image the objective back aperture plane onto the full size of the mirror plane. When the correct theoretical form of the global curvature term is used, the modified equation is as follows:

$$\delta OP = Dn_2 \cos\theta_2 \quad \text{Equation (3)}$$

The adaptive optical element is positioned at the pupil plane or any conjugated plane where the position of each ray of light depends only on the angle of emergence from the sample. Accordingly, the global curvature term, $f(D,\theta)$, is used to configure the adaptive optical element to focus the optical device to a particular depth within the sample, while the $D(n_2 \cos\theta_2 - n_1 \cos\theta_1)$ term is used to configure the adaptive optical element to correct aberrations for that depth of focus. Accordingly, an adaptive optical element configured according to Equation (2) can focus on a particular depth within the sample and simultaneously correct the spherical aberrations associated with that depth. Furthermore, using Equation (2) it is possible to rapidly shift the focus of the optical device to a new depth and correct the aberrations at that new depth without inducing forces on the sample.

This setup allows for the acquisition of corrected images of the sample at various depths of focus without any movement of the objective lens. These images can then be input into a processing unit for three-dimensional image reconstruction of the sample. If this process is repeated rapidly, i.e., the optical device acquires images of each depth within the sample of interest repeatedly and rapidly, it is possible to acquire four-dimensional images of the sample. Each set of images of the different depths of the sample can be reconstructed into a three-dimensional image, providing a multiplicity of three-dimensional images of the sample over a span of time. For example, in wide-field microscopy, a multiplicity of three-dimensional images over time can be acquired, showing the details of a process occurring in a cell.

The speed of the image acquisition will be limited by the image acquisition system's capability to rapidly acquire a multiplicity of images, as well as by the setting time of the adaptive optical element. The setting time is the time it takes for an adaptive optical element to reconfigure from one configuration to another. Preferably, the setting time is short enough to see the dynamics of the process of interest. Adaptive optical units with setting times as low as milliseconds are currently available. The speed at which adaptive optical elements can shift the focus of an optical system is faster than objective piezoelectric closed loop drives presently applied in focusing applications. Furthermore, the degree of change possible in depth of focus will depend on the throw of the adaptive optical element. The throw refers to the maximum axial movement. Adaptive optical elements with throws up to about ±75 micrometers are currently available, which is more than adequate for most optical device applications. Accordingly, the use of adaptive optics allows for the acquisition of four-dimensional images which capture the details of fast processes without the disadvantages associated with the objective lens movements and aberrations.

Another aspect of the invention is to correct sample-induced space-variant aberrations. Since many real life samples are typically not homogeneous, non-spherical aberrations are introduced, and they depend on the position. According to the present invention, adaptive optics can be used to correct sample-induced space-variant aberrations. These aberrations cause the shift in optical path measured at the back aperture to be depth dependent as well as position dependent for each depth, i.e., the shift in optical path will depend on both the depth of the plane of focus from which the ray of light originated and the position on that plane from which the ray originated. Accordingly, an adaptive optical element configured according to Equation (1) or Equation (2), which only provides for depth dependent aberrations, is ineffective at correcting all the aberrations in these systems.

According to the present invention, the method to correct these aberrations is by introducing an "inverse sample" into the optical path. The inverse sample is something that when placed in the optical path will correct the sample-induced phase shifts. According to the present invention, the inverse sample is designed using one or more adaptive optical elements. Preferably, more than one adaptive optical element is used. Even more preferably, three, four or five adaptive optical elements are used in tandem. When multiple adaptive optical elements are used in conjunction with each other, this is referred to as multi-conjugate adaptive optics.

In order to properly design the multi-conjugate adaptive optical system, refractive information about the sample is obtained. Methods for obtaining such information are known in the art. One such process is to acquire Differential Interference Contrast images, also known as DIC or Nomarski images. DIC images allow for the refractive index gradients of the sample to be estimated. Once the refractive index gradients are known, line integration can be used to make a three-dimensional map of the refractive properties of the sample (described in U.S. Pat. No. 6,658,142).

In order to implement the inverse sample, the rays emerging from the objective are refocused by a relay lens. This optical setup projects a three dimensional volume within the sample onto free space. In the non-aberrated case, rays crossing the free-space volume follow the exact path and angles by which they cross the sample. When aberrations are caused by fluctuations in the refractive index of the sample, phase shifts from the ideal (homogeneous sample) imaging conditions occur. These phase shifts depend for each ray on the position of its origin and angle of propagation. The inverse sample concept allows each ray to track the "conjugated" path with the complementary refractive index fluctuations that corrects the phase shifts induced by the sample. Since the relay optics images the 3D sample volume to the inverse sample volume, and every ray will pass through the inverse sample space tracking a path conjugated to the one in the original sample volume, configuring into the inverse sample the complementary refractive index of the sample will correct the phase shifts induced by the sample. For example, if the refractive index of the sample can be written as $n_{AV} + \delta n(xyz)$, the inverse sample refractive index should be $n_{AV} - \delta n(xyz)$.

The above description is exact only if refraction of the rays is negligibly small. In practice, when the sample refractive index fluctuations are small, as is the case in biological live samples, refraction can be neglected, and the major cause of sample-induced aberrations is phase shifts.

Therefore the inverse sample volume is approximated by a finite number of adaptive optical planes, each compensating for a finite thin slice around the plane from the hypothetical inverse sample volume.

At zeroth approximation, each one of the adaptive elements should shift the phases of rays that fall at a given point on it by the opposite amount that the corresponding sample slice induces. This means that the variations in the refractive index are integrated for each slice. If the integration is along the optical axis, z, it is known as a "z-projection".

A better approximation will be to integrate along the ray direction, and not along the optical axis, since different rays cross the sample at different angles. Consider first rays originating from the optical axis. Since each ray impinges on each adaptive element at a position only determined by its angle, the integration along these rays makes a better approximation for a presentation of the inverse sample by a finite number of adaptive elements.

While the above scheme is a good approximation for axial rays, the correction will degrade as the point of origin of the rays is shifted away towards the edge of the imaged field. A different approximation method that takes into account the edge of the imaged field is fully described in Tokovinin, Andrei and Le Louarn, Miska. "Isoplanatism in a Multiconjugate Adaptive Optics System" *Journal of the Optical Society of America*. 17(10) 1819-1827 (October 2000), incorporated herein by reference. The Tokovinin approximation states that the optimal way to correct for all rays emerging from all points in a finite field is to average the refractive index of planes within a diameter that grows with the distance from the plane of the adaptive element before adding it to the total phase shift setting for that adaptive element, thus evaluating the average phase shifts for multiple rays emerging from all field positions. While this approximation compromises the performance of the correction for the axial rays, it achieves better overall correction over the whole field, which is of essential value for wide-field microscopy.

BRIEF DESCRIPTION OF THE DRAWINGS

These and other objects and features of the invention will become more apparent by referring to the drawings, in which.

DETAILED DESCRIPTION OF THE FIGURES

Figure 1:
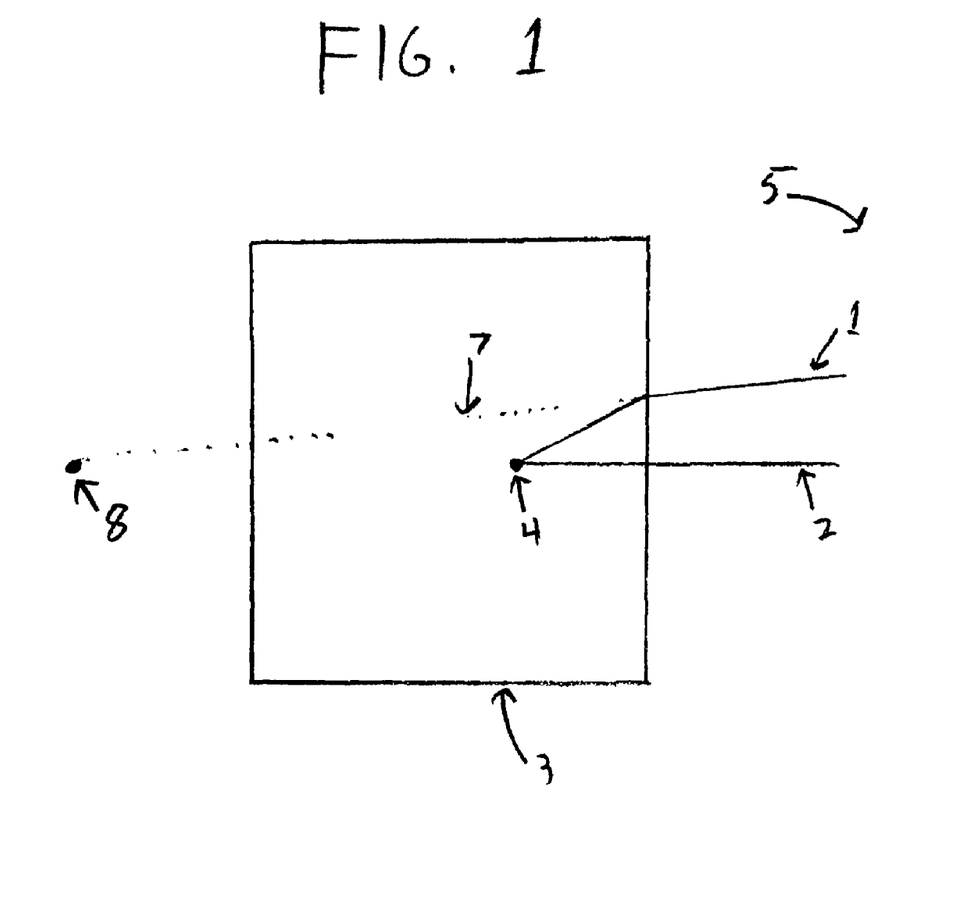
FIG. 1 is an illustration of two rays of light traveling through and exiting a sample.

FIG. 1 shows diagrammatically two rays of light, ray 1 and ray 2, traveling through and exiting a sample 3 into the atmosphere 5 around the sample. The atmosphere can be any medium outside the sample which has a different refractive index than the sample. For example, the atmosphere may be the air or immersion oil. Both rays of light originate from the same point 4. Ray 1 travels through the sample at an angle different than ray 2. Ray 2 travels through the sample perpendicular to the surface of the sample. Accordingly, when ray 2 exits the sample and enters the atmosphere it does not bend. On the other hand, ray 1 travels through the sample at a non-perpendicular angle to the surface of the sample. Accordingly, when ray 1 exits the sample and enters the atmosphere, it bends. To an observer in the atmosphere viewing ray 1 as it traveled out of the sample, it would appear that ray 1 had traveled along path 7 and originated from point 8. This is the source of aberration caused by the bending of the rays of light.

Furthermore, since the refractive index of the sample is different than the refractive index of the atmosphere, the rays of light travel at different speeds in the sample and the atmosphere. In order for the wave-front of all the rays originating from the same point in the sample to remain non-aberrated, each ray would need to travel in each environment (i.e., the sample or the atmosphere) then through the optical system, and finally reach the image after accumulating an equal optical path (multiplication of distance and refractive index). Since ray 2 is perpendicular to the surface of the sample and ray 1 is not perpendicular to the surface of the sample, ray 1 travels in the sample longer than ray 2. Accordingly, ray 1 and ray 2 become out of phase with each other, and the wave-front becomes dephased. These phase shifts could lead to constructive or destructive interference. A good optical system is designed to correct these phase shifts and create a non-aberrated wave front. However, this can be only achieved for a limited range of sample space. If rays from one point in the sample space are corrected by the optics to reach the imaged point with very small aberrations, there may be other points in the sample space that are not corrected.

Figure 2:
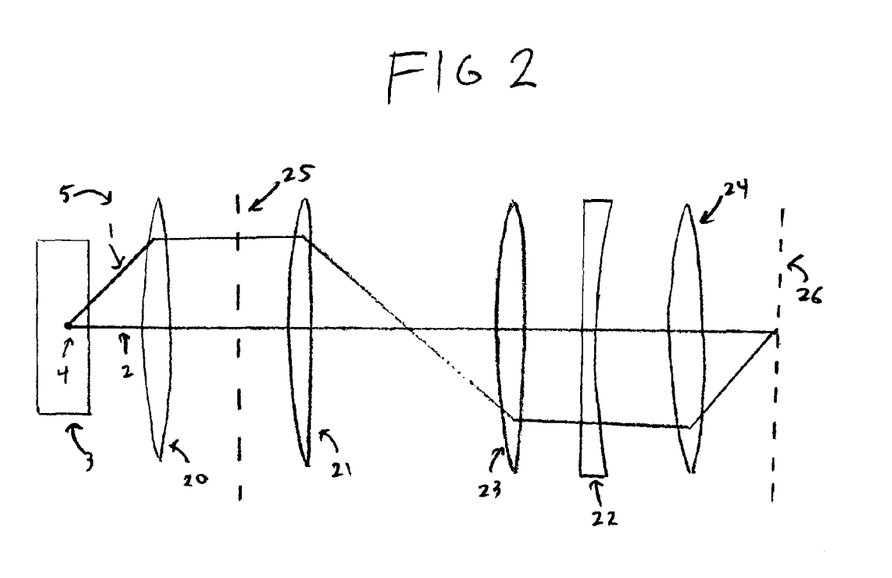
FIG. 2 is an illustration of the optical device correcting spherical aberrations according to one embodiment of present invention.

FIG. 2 shows the sample of FIG. 1 being analyzed in an optical device according to one embodiment of the present invention. The optical device is preferably a wide-field microscope, optical tweezers or an optical media drive, such as a DVD drive. Rays of light 1 and 2 are guided through the objective lens 20. The rays of light are transmitted past the back aperture plane 25 and through relay lenses 21 and 23. The light is then transmitted through the adaptive optical lens 22. The adaptive optical lens 22 is positioned at a conjugated back aperture pupil plane where the position of each ray of light depends upon the angle of emergence from the sample only. The rays of light are then guided through a tube lens 24, forming the image on the image acquisition plane 26. The acquired data at the acquisition plane has been corrected for aberrations. Other elements may be included in the optical device, but have been left out of FIG. 2 for simplicity.

According to one aspect of the invention, the adaptive optics is configured according to Equation (1):

$$\delta OP = D(n_2 \cos \theta_2 - n_1 \cos \theta_1) \quad \text{Equation (1)}$$

Equation (1) gives the shift in optical path for any ray of light emerging from a sample at any angle for each depth of focus. The refractive indexes of the sample and the atmosphere (or immersion medium), $n_2$ and $n_1$ respectively, are inherent to each system and are known or can be determined by any method known in the art. The depth of focus, D, is a variable controlled by the optical device. The angle at which the ray of light emerges from the sample, $\theta_1$, can be determined based upon the ray's position at the back aperture pupil plane. The angle at which the ray of light travels through the sample, $\theta_2$, can be calculated using Snell's Law, which states:

$$n_1 \sin \theta_1 = n_2 \sin \theta_2 \quad \text{Snell's Law}$$

With all these variables known, it is possible to determine the shift in optical path, $\delta OP$, according to equation (1). In order to correct the optical aberrations, the optical path of each ray needs to be modified by its respective shift in optical path.

According to the present invention, the adaptive optical element is used to modify the optical path of each ray according to Equation (1). Since the adaptive optical element is positioned at a back aperture pupil plane, the position that the ray hits the adaptive optical element will depend on the angle of emergence from the sample only. Equation (1) is then used to determine the shift in optical path of each ray of light according to its position on the adaptive optics. The adaptive optical element is then configured to modify the optical path of each ray according to its respective angle and depth (but independent of position within that depth) calculated from Equation (1).

Figure 3A:
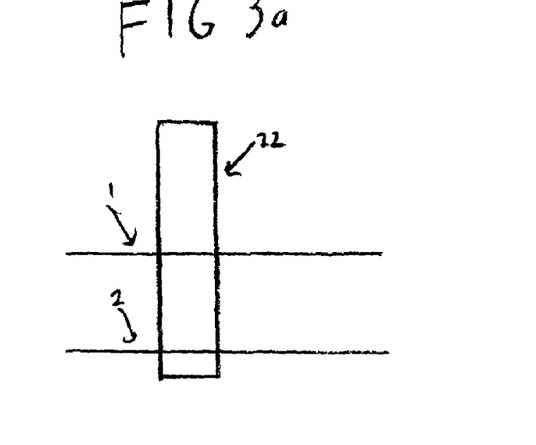
FIG. 3*a* depicts the deformable mirror in one position.
Figure 3B:
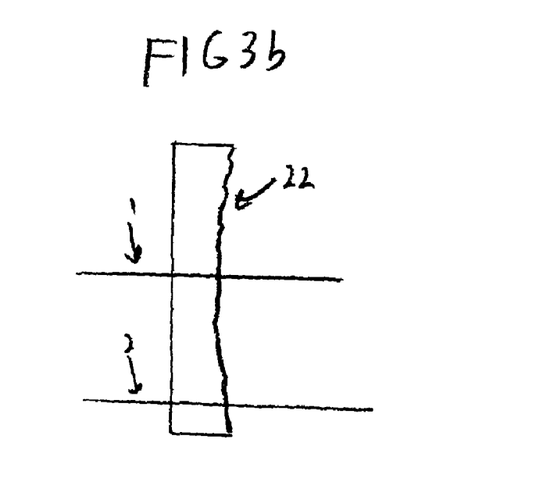
FIG. 3*b* depicts the deformable mirror in a second position.
Figure 3C:
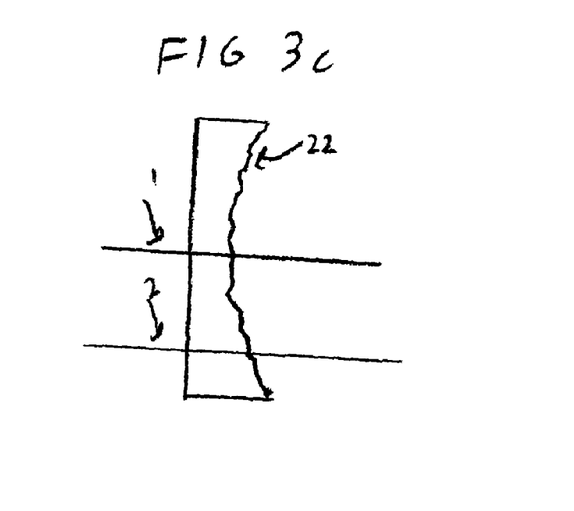
FIG. 3*c* depicts the deformable mirror in a third position.

The reconfiguration of the adaptive optical lens is shown schematically in FIGS. 3a-3c. FIG. 3a shows the adaptive optical lens when it is configured not to modify the relative optical path of any ray. When the optical device is focused at the surface of the sample, the depth is zero, and the shift in optical path for each ray is also zero. Accordingly, no correction is needed for any ray of light, and the adaptive optical is configured so that all rays of light travel without shifting their relative phases with respect to each other.

FIG. 3b shows the adaptive optical lens with some degree of curvature. This depicts the situation when the optical device is focused at a depth within the sample, and the adaptive optical lens is correcting spherical aberrations. In the case of adaptive lenses, since the thickness of the lens at the point where rays 1 hit the lens is smaller than the thickness where ray 2 hits, ray 2 travels through the lens for a greater distance than ray 1. Since the rays travel at a different speed in the lens compared to the atmosphere, the difference in distances traveled in the lens results in a change in the optical path of the rays relative to each other. In this way, the relative phase shift between rays 1 and 2 is corrected.

FIG. 3c shows the adaptive optical lens with an even greater degree of curvature, depicting the situation when the optical device is focusing at an even greater depth within the sample. In FIG. 3c the distance traveled by ray 1 through the lens is even shorter than the distance traveled by ray 1 in FIG. 3b since the lens is even thinner in FIG. 3c. In this way, the relative phase shift between rays 1 and 2 is corrected.

According to another aspect of the invention, the adaptive optics is configured according to Equation (2):

$$\delta OP = D(n_2 \cos \theta_2 - n_1 \cos \theta_1) + f(D, \theta) \quad \text{Equation (2)}$$

Equation (2) allows for the simultaneous shift of focus of the optical device and the correction of spherical aberrations associated with that depth of focus. If the optical device is configured to focus on the surface of the sample without the use of the adaptive optics, FIG. 3a shows how the lens would be configured to keep the focus on the surface of the sample. Since the adaptive optical lens is flat, the adaptive optical lens does not change the focus of the system.

According to another aspect of the invention, the adaptive optics is configured according to Equation (3):

$$\delta OP = Dn_2 \cos \theta_2 \quad \text{Equation (3)}$$

Equation (3) is Equation (2) when the correct theoretical form of the spherical curvature term is used, and allows for the simultaneous shift of focus of the optical device and the correction of spherical aberrations associated with that depth of focus. If the optical device is configured to focus on the surface of the sample without the use of the adaptive optics, FIG. 3a shows how the lens would be configured to keep the focus on the surface of the sample. Since the adaptive optical lens is flat, the adaptive optical lens does not change the focus of the system.

FIG. 3b depicts the optical device when the focus has been shifted to a new depth within the sample using the adaptive optical lens. The adaptive optical lens is now configured according to Equation (2) or Equation (3) for the desired depth of focus. Accordingly, the adaptive optical lens has shifted the focus to the desired depth of focus, and is simultaneously correcting the spherical aberrations associated with that depth.

FIG. 3c depicts the optical device when the focus has been shifted to a new depth even deeper within the sample using the adaptive optical lens. The adaptive optical lens is now configured according to Equation (2) or Equation (3) for the newly desired depth of focus. Accordingly, the adaptive optical lens has shifted the focus to the desired depth of focus, and is simultaneously correcting the spherical aberrations associated with that depth.

The present invention can be used in all optical devices. Preferably it is used in wide-field microscopes, optical tweezers or optical media devices, preferably a DVD drive. When the invention is used in wide-field microscopes, it is possible to acquire non-aberrated images of the sample at different depths of focus within the sample. The images can then be reconstructed to a three-dimensional image using a processing unit and a deconvolution process. According to the invention, the depth of focus can be repeatedly and rapidly shifted, providing for four-dimensional images of the sample.

When the invention is used in optical tweezers, it is possible to create a sharp laser focus and strong light gradients deep within a sample, allowing for precise use of the optical tweezers. It is then possible to move and trap particles within the sample without using laser power levels that may be damaging to the sample.

When the invention is used in a DVD drive, it is possible to write or read data on numerous different data layers within the DVD. The adaptive optical element is used to correct spherical aberrations associated with focusing on a data layer within the DVD. Furthermore, the adaptive optical element can be used to shift the focus of the light beam between different data layers on the DVD, while simultaneously correcting the spherical aberrations caused by the depth of that data layer. The invention can be used for focusing the light beam while writing data onto the DVD, or while reading data from the DVD.

Adaptive optics are currently expensive. Accordingly, the cost of the typical DVD player would rise significantly with the incorporation of an adaptive optic system. The concept of writing multi-layer DVDs can be advantageous if the equipment required to copy the DVDs is expensive, since these DVDs would not be easily copied without expensive equipment. It is possible, according to the present invention, to write data onto multiple layers of a DVD using a DVD writer incorporating an adaptive optical system without any spherical aberrations.

Another aspect of the present invention provides an alternative method for reading data off a multi-layer optical disk, such as a multi-layer DVD. DVD readers are designed to focus a light beam at one particular data layer of the DVD, typically the layer at the surface. When a DVD reader tries to focus at a different layer, spherical aberrations are introduced and the diameter of the light beam widens. When the light beam widens, the spot of light will fall on more than 1 data bit. The present invention provides a deconvolution-like algorithm. This algorithm can be run by a digital microprocessor, and, therefore, provides a low cost, yet effective alternative for reading data from a multi-layer DVD.

When the light beam is too wide, the DVD reader will read the convolution of the desired data bit and several neighboring data bits. Since the data is read sequentially, through the deconvolution-like algorithm, it is possible to subtract the convolved contribution of the previous data bits and determine the value of the next data bit. Deconvolution-like processes are known in the art, and any of these methods may be used. Examples of deconvolution-like processes can be found in Swedlow, J. R., Sedat, J. W., Agard, D. A., Deconvolution in Optical Microscopy. Chapter in Deconvolution of Images and Spectra $2^{nd}$ ed., Jansson, P. A. ed., Academic Press (1997); incorporated herein by reference, Swedlow J R, Platani M. "Live cell imaging using wide-field microscopy and deconvolution" *Cell Struct Funct* 27(5):335-41 (2002), incorporated herein by reference and Swedlow J R. Quantitative fluorescence microscopy and image deconvolution. *Methods Cell Biol.* 72:349-67 (2003), incorporated herein by reference.

Since the deconvolution-like process requires the use of a micro-processor, other processes that use micro-processors can be easily incorporated into the DVD reader. One such process is encryption. An encryption process can be easily added to the DVD reader, since a micro-processor is already incorporated, making the information on the DVD available only to certified people.

Figure 4:
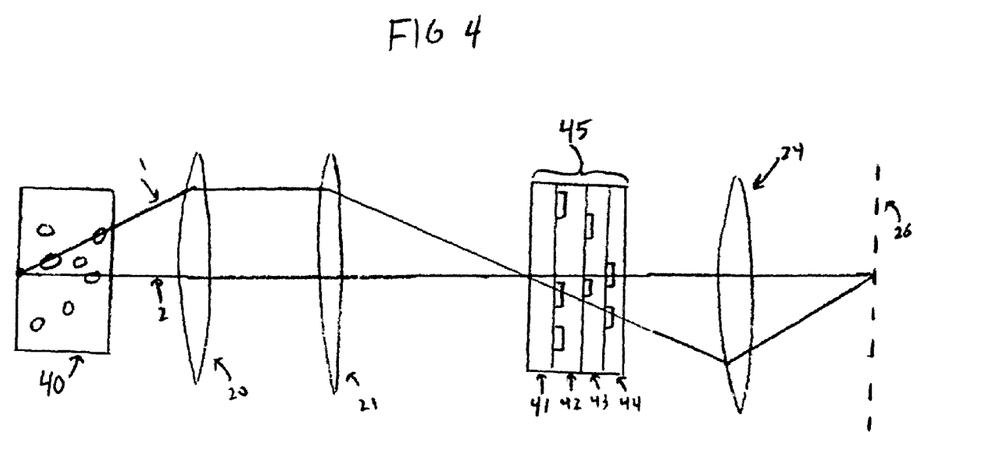
FIG. 4 is an illustration of the optical device including a multi-conjugate adaptive optical device system.

FIG. 4 shows an inhomogeneous sample 40 being analyzed in an optical device according to one embodiment of the present invention. The optical device is preferably a wide-field microscope, optical tweezers or an optical media drive, such as a DVD drive. Rays of light 1 and 2 travel through the sample 40, where they travel through segments of the sample that have different refractive indexes than the rest of the sample. Rays 1 and 2 are then guided through an objective lens 20 and through a relay lens 21. The light is then transmitted through a multi-conjugate adaptive optical system 45. The multi-conjugate adaptive optical system 45 includes adaptive optical elements 41, 42, 43 and 44. The rays of light are then transmitted through a tube lens 24. The rays then fall upon the image acquisition plane 26. The acquired data at the acquisition plane has been corrected for aberrations. Other elements may be included in the optical device, but have been left out of FIG. 4 for simplicity.

According to one aspect of the present invention, the multi-conjugate adaptive optical system can be configured to estimate an inverse sample, meaning that the multi-conjugate adaptive optical system is designed to correct the aberrations caused by the refractive indexes of the inhomogeneous sample. This configuration can be according to any known approximation method. Each of adaptive optical elements 41, 42, 43 and 44 are configured to correct for the aberrations of a corresponding slice of the inhomogeneous sample 40.

One possible approximation to configure the multi-conjugate adaptive optical system is known as the z-sum method. The inhomogeneous sample is estimated to consist of slices, each slice corresponding to an adaptive optical element in the multi-conjugate adaptive optical system. According to the z-sum method, the variations in refractive index are integrated for each slice of the sample along the optical axis, or the z-axis. These integrations provide the cumulative effect of all the refractive index variations in the slices of the sample. The corresponding adaptive optical element in the multi-conjugate adaptive optical system is then configured to correct for the cumulative effect of the refractive indexes of the slices. Accordingly, as the rays of light travel through each optical element in the multi-conjugate adaptive optical system, the aberration created by a particular slice of the sample is corrected.

Another method of approximation similar to the z-sum method is when the adaptive optical elements are configured according to the integration of the refractive indexes of the slices of the sample, when the integration is performed along the path of the rays emerging from the center of the sampled field. These integrations also provide the cumulative effect of all the refractive index variations in the slice of the sample. The corresponding adaptive optical element in the multi-conjugate adaptive optical system is then configured to correct for the cumulative effect of the refractive indexes of the slice. Accordingly, as the rays of light travel through each optical element in the multi-conjugate adaptive optical system, the aberration for a particular slice of the sample is corrected.

Yet another method of approximation is the Tokovinin method. According to the Tokovinin method, each adaptive optical element is approximated by averaging the refractive index of planes within the slice of the sample within a diameter that grows with distance from the plane of the adaptive optical element before adding it to the total phase shift setting for the adaptive optical element. This allows for the evaluation of the average phase shifts for multiple rays emerging from all field positions.

The invention claimed is:

1. A system for correcting optical aberrations in an optical device comprising an adaptive optical system, wherein the adaptive optical system comprises at least one adaptive optical element positioned in a pupil plane and is capable of correcting optical aberrations at a first depth of focus within a sample, wherein the adaptive optical element is capable of being reconfigured to correct for optical aberrations at a second depth within the sample, the second depth being different from the first depth, wherein the adaptive optical element shifts the optical path of a ray of light according to the following relationship:

$$\delta OP = D(n_2 \cos \theta_2 - n_1 \cos \theta_1)$$

wherein
  $\delta OP$=the shift in optical path,
  D=a depth of a point source within a sample from which the ray originates,
  $n_1$=a refractive index of an atmosphere external to the sample,
  $\theta_1$=an angle relative to a surface of the sample at which the ray of light emerges from the sample and travels through the atmosphere after it emerges from the sample,
  $n_2$=a refractive index of the sample, and
  $\theta_2$=an angle relative to the surface of the sample at which the ray of light travels through the sample.

2. A system for correcting optical aberrations in an optical device comprising an adaptive optical system, wherein the adaptive optical system comprises at least one adaptive optical element positioned in a pupil plane and is capable of correcting optical aberrations at a first depth of focus within a sample, wherein the adaptive optical element is capable of being reconfigured to correct for optical aberrations at a second depth within the sample, the second depth being different from the first depth, wherein the adaptive optical element shifts the optical path of a ray of light according to the following relationship:

$$\delta OP = D(n_2 \cos \theta_2 - n_1 \cos \theta_1) + f(D, \theta)$$

wherein
  $\delta OP$=the shift in optical path,
  D=a depth of a point source within a sample from which the ray originates,
  $n_1$=a refractive index of an atmosphere external to the sample, θ₁=an angle relative to a surface of the sample at which the ray of light emerges from the sample and travels through the atmosphere after it emerges from the sample, $n_2$=a refractive index of the sample, θ₂=an angle relative to the surface of the sample at which the ray of light travels through the sample, f(D,θ)=is a global curvature term and a function of θ and D, and θ is proportional to a radius measured from the axial center of the adaptive element.

3. A system for correcting optical aberrations in an optical device comprising an adaptive optical system, wherein the adaptive optical system comprises at least one adaptive optical element positioned in a pupil plane and is capable of correcting optical aberrations at a first depth of focus within a sample, wherein the adaptive optical element is capable of being reconfigured to correct for optical aberrations at a second depth within the sample, the second depth being different from the first depth, wherein the adaptive optical element shifts the optical path of a ray of light according to the following relationship:

$$\delta OP = Dn_2 \cos \theta_2$$

wherein

δOP =the shift in optical path,

D=a depth of a point source within a sample from which the ray originates, $n_2$=a refractive index of the sample, θ₂=an angle relative to the surface of the sample at which the ray of light travels through the sample.

4. The system of claim 1, wherein the optical device includes a wide-field microscope.

5. The system of claim 2, wherein the optical device includes a wide-field microscope.

6. The system of claim 3, wherein the optical device includes a wide-field microscope.

7. The system of claim 1, wherein the optical device includes optical tweezers.

8. The system of claim 2, wherein the optical device includes optical tweezers.

9. The system of claim 3, wherein the optical device includes optical tweezers.

10. The system of claim 1, wherein the optical device includes an optical media drive.

11. The system of claim 2, wherein the optical device includes an optical media drive.

12. The system of claim 3, wherein the optical device includes an optical media drive.

13. The system of claim 10, wherein the optical device includes a DVD drive.

14. The system of claim 11, wherein the optical device includes a DVD drive.

15. The system of claim 12, wherein the optical device includes a DVD drive.

16. The system of claim 1, wherein each adaptive optical element comprises a liquid lens, a deformable membrane mirror, a micro electro-mechanical mirror, or liquid crystal phase and amplitude modulators.

17. The system of claim 2, wherein each adaptive optical element comprises a liquid lens, a deformable membrane mirror, a micro electro-mechanical mirror, or liquid crystal phase and amplitude modulators.

18. The system of claim 1, wherein each adaptive optical element is transmissive and is positioned in the optical path of the optical device.

19. The system of claim 2, wherein each adaptive optical element is transmissive and is positioned in the optical path of the optical device.

20. The system of claim 1, further comprising relay optics which are used to create a real conjugated pupil plane, wherein each adaptive optical element is reflective and is positioned at the real conjugated pupil plane.

21. The system of claim 2, further comprising relay optics which are used to create a real conjugated pupil plane, wherein each adaptive optical element is reflective and is positioned at the real conjugated pupil plane.

22. The system of claim 4, further comprising a processing unit, wherein the wide-field microscope acquires a plurality of images at different depths of focus within the sample, and the processing unit performs a deconvolution process in which the out-of-focus parts of the images are shuffled back to their points of origin in the sample and a three-dimensional image is constructed.

23. The system of claim 5, further comprising a processing unit, wherein the wide-field microscope acquires a plurality of images at different depths of focus within the sample, and the processing unit performs a deconvolution process in which the out-of-focus parts of the images are shuffled back to their points of origin in the sample and a three-dimensional image is constructed.

24. The system of claim 5, wherein the wide-field microscope successively acquires a plurality of images at different depths of focus within the sample over a predetermined period of time.

25. A method for correcting optical aberrations in an optical device comprising the following steps:

(a) positioning an adaptive optical system in a pupil plane, wherein the adaptive optical system comprises at least one adaptive optical element;

(b) configuring the adaptive optical element to correct optical aberrations at a first depth of focus within a sample; and (c) reconfiguring the adaptive optical element to correct for optical aberrations at a second depth within the sample, the second depth being different from the first depth, wherein the adaptive optical element shifts the optical path of a ray of light according to the following relationship:

$$\delta OP = D(n_2 \cos \theta_2 - n_1 \cos \theta_1)$$

wherein

δOP=the shift in optical path,

D=a depth of a point source within a sample from which the ray originates, $n_1$=a refractive index of an atmosphere external to the sample, θ₁=an angle relative to a surface of the sample at which the ray of light emerges from the sample and travels through the atmosphere after it emerges from the sample, $n_2$=a refractive index of the sample, and θ₂=an angle relative to the surface of the sample at which the ray of light travels through the sample.

26. A method for correcting optical aberrations in an optical device comprising the following steps:

(a) positioning an adaptive optical system in a pupil plane, wherein the adaptive optical system comprises at least one adaptive optical element;

(b) configuring the adaptive optical element to correct optical aberrations at a first depth of focus within a sample; and (c) reconfiguring the adaptive optical element to correct for optical aberrations at a second depth within the sample, the second depth being different from the first depth, wherein the adaptive optical element shifts the optical path of a ray of light according to the following relationship:

$$\delta OP = D(n_2 \cos\theta_2 - n_1 \cos\theta_1) + f(D,\theta)$$

wherein
 $\delta OP$ = the shift in optical path,
 D = a depth of a point source within a sample from which the ray originates,
 $n_1$ = a refractive index of an atmosphere external to the sample,
 $\theta_1$ = an angle relative to a surface of the sample at which the ray of light emerges from the sample and travels through the atmosphere after it emerges from the sample,
 $n_2$ = a refractive index of the sample,
 $\theta_2$ = an angle relative to the surface of the sample at which the ray of light travels through the sample,
 $f(D,\theta)$ = is a global curvature term and a function of $\theta$ and D, and
 $\theta$ is proportional to a radius measured from the axial center of the adaptive element.

27. The method of claim 25, wherein the optical device is a wide-field microscope, further comprising the following steps:
 (d) acquiring a plurality of images at different depths of focus within the sample, and
 (e) performing a deconvolution process, wherein the out-of-focus parts of the images are shuffled back to their points of origin in the sample and a three-dimensional image is constructed.

28. The method of claim 26, wherein the optical device is a wide-field microscope, further comprising the following steps:
 (d) acquiring a plurality of images at different depths of focus within the sample, and
 (e) performing a deconvolution process, wherein the out-of-focus parts of the images are shuffled back to their points of origin in the sample and a three-dimensional image is constructed.

29. The method of claim 26, wherein the optical device is a wide-field microscope, further comprising the following step:
 (d) acquiring a plurality of images at different depths of focus within the sample successively over a predetermined period of time.

30. A system for correcting optical aberrations in an optical device comprising an adaptive optical system, wherein the adaptive optical system comprises at least one adaptive optical element positioned in a pupil plane and is capable of correcting optical aberrations by modulation of the optical path and amplitude of a substantially entire wavefront passing through the pupil plane, as a function of the position of the optical path in the pupil plane, the correction being performed at a first depth of focus within a sample, wherein the adaptive optical element is capable of being reconfigured to correct for optical aberrations at a second depth within the sample, the second depth being different from the first depth, and wherein the adaptive optical element shifts the optical path of a ray of light according to the following relationship:

$$\delta OP = D(n_2 \cos\theta_2 - n_1 \cos\theta_1)$$

wherein
 $\delta OP$ = the shift in optical path,
 D = a depth of a point source within a sample from which the ray originates,
 $n_1$ = a refractive index of an atmosphere external to the sample,
 $\theta_1$ = an angle relative to a surface of the sample at which the ray of light emerges from the sample and travels through the atmosphere after it emerges from the sample,
 $n_2$ = a refractive index of the sample, and
 $\theta_2$ = an angle relative to the surface of the sample at which the ray of light travels through the sample.

31. A system for correcting optical aberrations in an optical device comprising an adaptive optical system, wherein the adaptive optical system comprises at least one adaptive optical element positioned in a pupil plane and is capable of correcting optical aberrations by modulation of the optical path and amplitude of a substantially entire wavefront passing through the pupil plane, as a function of the position of the optical path in the pupil plane, the correction being performed at a first depth of focus within a sample, wherein the adaptive optical element is capable of being reconfigured to correct for optical aberrations at a second depth within the sample, the second depth being different from the first depth, and wherein the adaptive optical element shifts the optical path of a ray of light according to the following relationship:

$$\delta OP = D(n_2 \cos\theta_2 - n_1 \cos\theta_1) + f(D,\theta)$$

wherein
 $\delta OP$ = the shift in optical path,
 D = a depth of a point source within a sample from which the ray originates,
 $n_1$ = a refractive index of an atmosphere external to the sample,
 $\theta_1$ = an angle relative to a surface of the sample at which the ray of light emerges from the sample and travels through the atmosphere after it emerges from the sample,
 $n_2$ = a refractive index of the sample,
 $\theta_2$ = an angle relative to the surface of the sample at which the ray of light travels through the sample,
 $f(D,\theta)$ = is a global curvature term and a function of $\theta$ and D, and
 $\theta$ is proportional to a radius measured from the axial center of the adaptive element.

32. A system for correcting optical aberrations in an optical device comprising an adaptive optical system, wherein the adaptive optical system comprises at least one adaptive optical element positioned in a pupil plane and is capable of correcting optical aberrations by modulation of the optical path and amplitude of a substantially entire wavefront passing through the pupil plane, as a function of the position of the optical path in the pupil plane, the correction being performed at a first depth of focus within a sample, wherein the adaptive optical element is capable of being reconfigured to correct for optical aberrations at a second depth within the sample, the second depth being different from the first depth, and wherein the adaptive optical element shifts the optical path of a ray of light according to the following relationship:

$$\delta OP = D n_2 \cos\theta_2$$

wherein
 $\delta OP$ = the shift in optical path,
 D = a depth of a point source within a sample from which the ray originates,
 $n_2$ = a refractive index of the sample,
 $\theta_2$ = an angle relative to the surface of the sample at which the ray of light travels through the sample.

33. The system of claim 30, wherein the optical device includes a wide-field microscope.

34. The system of claim 31, wherein the optical device includes a wide-field microscope.

35. The system of claim 32, wherein the optical device includes a wide-field microscope.

36. The system of claim 30, wherein the optical device includes optical tweezers.

37. The system of claim 31, wherein the optical device includes optical tweezers.

38. The system of claim 32, wherein the optical device includes optical tweezers.

39. The system of claim 30, wherein the optical device includes an optical media drive.

40. The system of claim 31, wherein the optical device includes an optical media drive.

41. The system of claim 32, wherein the optical device includes an optical media drive.

42. The system of claim 39, wherein the optical device includes a DVD drive.

43. The system of claim 40, wherein the optical device includes a DVD drive.

44. The system of claim 41, wherein the optical device includes a DVD drive.

45. The system of claim 30, wherein each adaptive optical element comprises a liquid lens, a deformable membrane mirror, a micro electro-mechanical mirror, or liquid crystal phase and amplitude modulators.

46. The system of claim 31, wherein each adaptive optical element comprises a liquid lens, a deformable membrane mirror, a micro electro-mechanical mirror, or liquid crystal phase and amplitude modulators.

47. The system of claim 30, wherein each adaptive optical element is transmissive and is positioned in the optical path of the optical device.

48. The system of claim 31, wherein each adaptive optical element is transmissive and is positioned in the optical path of the optical device.

49. The system of claim 30 further comprising relay optics which are used to create a real conjugated pupil plane, wherein each adaptive optical element is reflective and is positioned at the real conjugated pupil plane.

50. The system of claim 31, further comprising relay optics which are used to create a real conjugated pupil plane, wherein each adaptive optical element is reflective and is positioned at the real conjugated pupil plane.

51. The system of claim 33, further comprising a processing unit, wherein the wide-field microscope acquires a plurality of images at different depths of focus within the sample, and the processing unit performs a deconvolution process in which the out-of-focus parts of the images are shuffled back to their points of origin in the sample and a three-dimensional image is constructed.

52. The system of claim 34, further comprising a processing unit, wherein the wide-field microscope acquires a plurality of images at different depths of focus within the sample, and the processing unit performs a deconvolution process in which the out-of-focus parts of the images are shuffled back to their points of origin in the sample and a three-dimensional image is constructed.

53. The system of claim 34, wherein the wide-field microscope successively acquires a plurality of images at different depths of focus within the sample over a predetermined period of time.

54. A method for correcting optical aberrations in an optical device comprising the following steps:

(a) positioning an adaptive optical system in a pupil plane, wherein the adaptive optical system comprises at least one adaptive optical element;

(b) configuring the adaptive optical element to correct optical aberrations at a first depth of focus within a sample, by modulation of the optical path and amplitude of a wavefront passing through the pupil plane, as a function of the position of the optical path in the pupil plane; and (c) reconfiguring the adaptive optical element to correct for optical aberrations at a second depth within the sample, the second depth being different from the first depth, wherein the adaptive optical element shifts the optical path of a ray of light according to the following relationship:

$$\delta OP = D(n_2 \cos \theta_2 - n_1 \cos \theta_1)$$

wherein
  $\delta OP$ = the shift in optical path,
  $D$ = a depth of a point source within a sample from which the ray originates,
  $n_1$ = a refractive index of an atmosphere external to the sample,
  $\theta_1$ = an angle relative to a surface of the sample at which the ray of light emerges from the sample and travels through the atmosphere after it emerges from the sample,
  $n_2$ = a refractive index of the sample, and
  $\theta_2$ = an angle relative to the surface of the sample at which the ray of light travels through the sample.

55. A method for correcting optical aberrations in an optical device comprising the following steps:

(a) positioning an adaptive optical system in a pupil plane, wherein the adaptive optical system comprises at least one adaptive optical element;

(b) configuring the adaptive optical element to correct optical aberrations at a first depth of focus within a sample, by modulation of the optical path and amplitude of a wavefront passing through the pupil plane, as a function of the position of the optical path in the pupil plane; and (c) reconfiguring the adaptive optical element to correct for optical aberrations at a second depth within the sample, the second depth being different from the first depth, wherein the adaptive optical element shifts the optical path of a ray of light according to the following relationship:

$$\delta OP = D(n_2 \cos \theta_2 - n_1 \cos \theta_1) + f(D, \theta)$$

wherein
  $\delta OP$ = the shift in optical path,
  $D$ = a depth of a point source within a sample from which the ray originates,
  $n_1$ = a refractive index of an atmosphere external to the sample,
  $\theta_1$ = an angle relative to a surface of the sample at which the ray of light emerges from the sample and travels through the atmosphere after it emerges from the sample,
  $n_2$ = a refractive index of the sample,
  $\theta_2$ = an angle relative to the surface of the sample at which the ray of light travels through the sample,
  $f(D, \theta)$ = is a global curvature term and a function of $\theta$ and $D$, and
  $\theta$ is proportional to a radius measured from the axial center of the adaptive element.

56. The method of claim 54, wherein the optical device is a wide-field microscope, further comprising the following steps:

(d) acquiring a plurality of images at different depths of focus within the sample, and (e) performing a deconvolution process, wherein the out-of-focus parts of the images are shuffled back to their points of origin in the sample and a three-dimensional image is constructed.

57. The method of claim 55, wherein the optical device is a wide-field microscope, further comprising the following steps:

(d) acquiring a plurality of images at different depths of focus within the sample, and (e) performing a deconvolution process, wherein the out-of-focus parts of the images are shuffled back to their points of origin in the sample and a three-dimensional image is constructed.

58. The method of claim 55, wherein the optical device is a wide-field microscope, further comprising the following step:

(d) acquiring a plurality of images at different depths of focus within the sample successively over a predetermined period of time.

* * * * *

UNITED STATES PATENT AND TRADEMARK OFFICE
CERTIFICATE OF CORRECTION

| | | |
|---|---|---|
| PATENT NO. | : 7,764,433 B2 | Page 1 of 1 |
| APPLICATION NO. | : 11/419070 | |
| DATED | : July 27, 2010 | |
| INVENTOR(S) | : Zvi Kam et al. | |

It is certified that error appears in the above-identified patent and that said Letters Patent is hereby corrected as shown below:

Column 1; lines 5 through 8:

Delete: "This invention was made with government support under NIH Grant Nos. GM025101 and GM031627. Accordingly, the United states government may have certain rights in the invention."

Insert: --This invention was made with government support under Grants No. GM025101 and No. GM031627 awarded by the National Institutes of Health. The government has certain rights in the invention.--

Signed and Sealed this
Twenty-fifth Day of January, 2011

David J. Kappos
*Director of the United States Patent and Trademark Office*